United States Patent [19]

Missman

[11] Patent Number: 5,001,828
[45] Date of Patent: Mar. 26, 1991

[54] APPARATUS FOR REMOVING COIL WIRE FROM A STATOR

[76] Inventor: Eugene E. Missman, 2300 N. 26th St., Boise, Id. 83702

[21] Appl. No.: 548,500

[22] Filed: Jul. 3, 1990

[51] Int. Cl.⁵ .......................................... H02K 15/00
[52] U.S. Cl. ...................................... 29/732; 29/252; 29/403.3; 29/426.4; 29/596
[58] Field of Search .................. 29/403.3, 403.1, 596, 29/732, 736, 426.4, 426.5, 252

[56] References Cited

U.S. PATENT DOCUMENTS 4,016,639  4/1977  Dombrowski et al. ............... 29/596

Primary Examiner—Carl E. Hall
Attorney, Agent, or Firm—Paul F. Horton

[57] ABSTRACT

Apparatus and method for removing coil wire from a stator. The apparatus includes a stator support for holding the stator in a fixed position relative to a wire remover. The remover includes a push rod, of substantially the same shape as a stator slot, in cross-section, and a piston-cylinder unit for reciprocally moving the push rod within a stator slot. For removing the wire, opposing end turns of the stator coil are severed from each end of the stator. The push rod is positioned over and in alignment with the stator slot and brought into contact with the wire. Upon actuation of the piston, the push rod is moved through the stator slot to clear the slot of wire and insulation. The stator support is provided with a slotted foot member which engages a bottom surface of the stator adjacent the slot to prevent breakage of teeth defining the stator slot. The stator support also includes apparatus for engaging the bore of the stator for holding the stator in a fixed position relative to the wire remover.

10 Claims, 2 Drawing Sheets

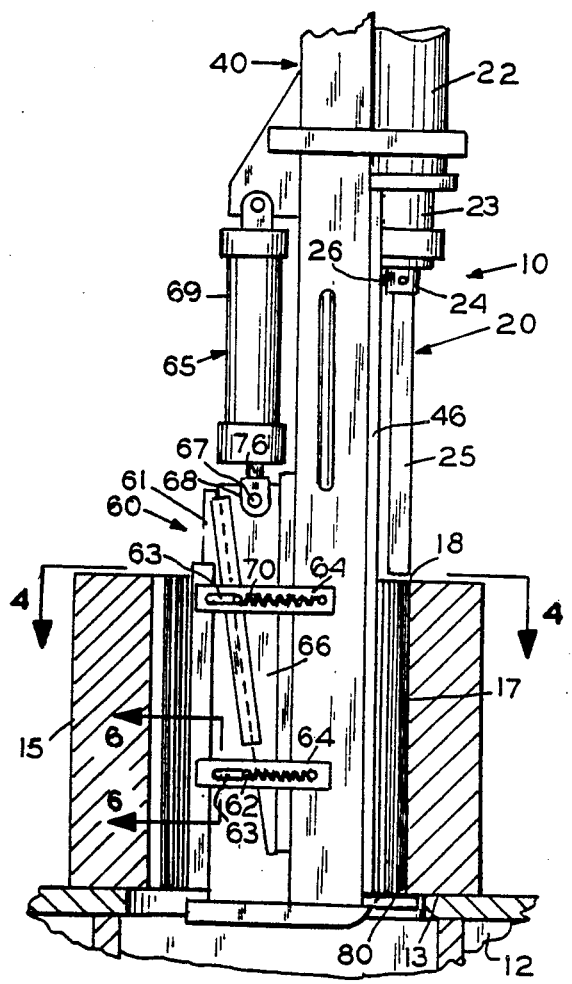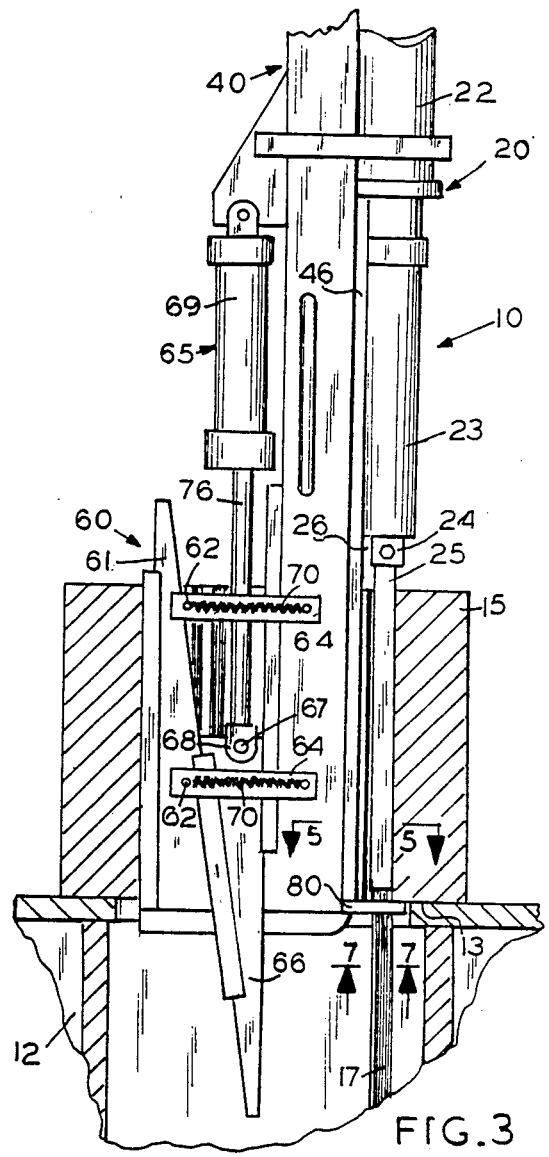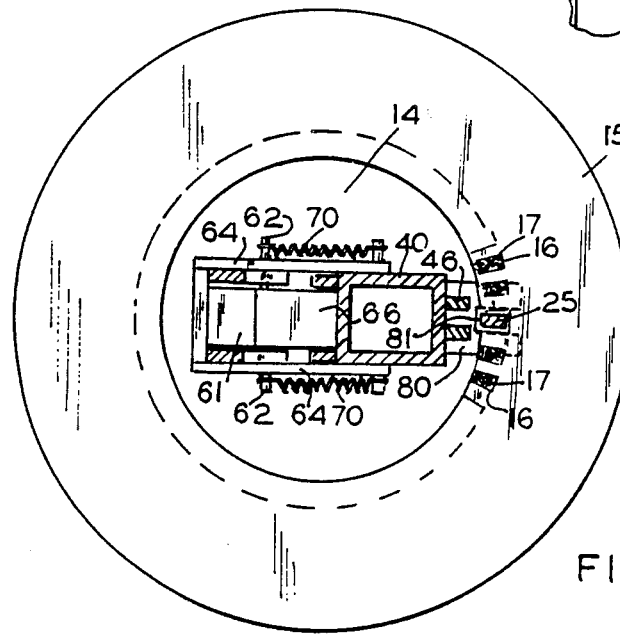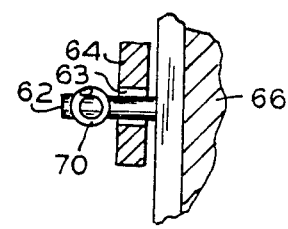
FIG. 2
FIG. 3
FIG. 4
FIG. 6

APPARATUS FOR REMOVING COIL WIRE FROM A STATOR

BACKGROUND OF THE INVENTION

1. Field of the Invention

This invention relates to apparatus and method for removing coil wire from a stator.

2. Description of the Prior Art

Large electric motors have, as a part of their construction, stators having generally planar and parallel end faces intersected by a bore extending axially therethrough. A plurality of elongated longitudinal slots, defined by stator teeth, and radially extending and intersecting with both the bore and opposing end faces, hold a plurality of coil wires, as is well known in the motor construction art. The coil wires extend through the slot and run lengthwise with the slot and emerge from opposing ends of the slot at the end faces of the stator where they are turned so as to enter other slots of the stator. Such turnings are known as end turns. Often, each slot of the stator is provided with insulation and the coil wires themselves may be coated with varnish, or the like, for insulating properties.

Because of the value of the stator housing and the value of the wire coil, generally copper, it is highly desirable to separate the wire from the stator where the stator has become defective due to manufacturing or usage defects. In this manner, the stator housing may be reused for new windings and the removed wire may be sold as scrap.

One prior method of removing the wire was to sever the end turns from one end of the stator and, utilizing tongs connected to the other end turns, pull the wire from the stator. Such operation resulted in both teeth breakage and incomplete clearance of the wire from the slots.

Another method, suggested by F. Dombrowski, U.S. Pat. No. 4,030,184, included severing wire from one end of the stator, seating the stator in a fixed position, gripping the end turns from the opposing end of the stator, and then driving the seating means and stator away from the gripped wire to strip the wire from the stator.

Because prior methods have both damaged the stator housing and resulted in inefficient removal of the wire, much salvage has been done by hand, hammering the wire out with a punch. Misalignment of the punch could result in the scarring of the stator slots or breakage of the teeth.

SUMMARY OF THE INVENTION

The present invention overcomes the problems of the prior art by providing a method and apparatus for removing coil wire from a stator which includes the severing of end turns from both ends of a stator; supporting the stator in a fixed position relative to a piston driven push rod so that a slot of the stator is in vertical alignment with the push rod and then actuating the piston to push wire from the slot. Both the piston-push rod unit and the stator supporting unit are affixed to a common vertical beam to insure alignment. The supporting unit is provided with lateral expansion capabilities for engaging stator bores of varying diameters. A slotted foot member assures the integrity of the stator teeth defining a stator slot while allowing for free passage of the wire therethrough.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 2 is a partial side view of the apparatus of FIG. 1, showing the stator support means in a contracted mode and the push rod in a retracted mode.

FIG. 3 is a partial side view of the apparatus of FIG. 1, showing the stator support means in an expanded mode and the push rod in an extended mode.

FIG. 4 is an enlarged sectional view taken along lines 4—4 of FIG. 2.

FIG. 6 is a sectional view taken along lines 6—6 of FIG. 2.

DETAILED DESCRIPTION OF THE INVENTION

Figures 1, 5, 7:
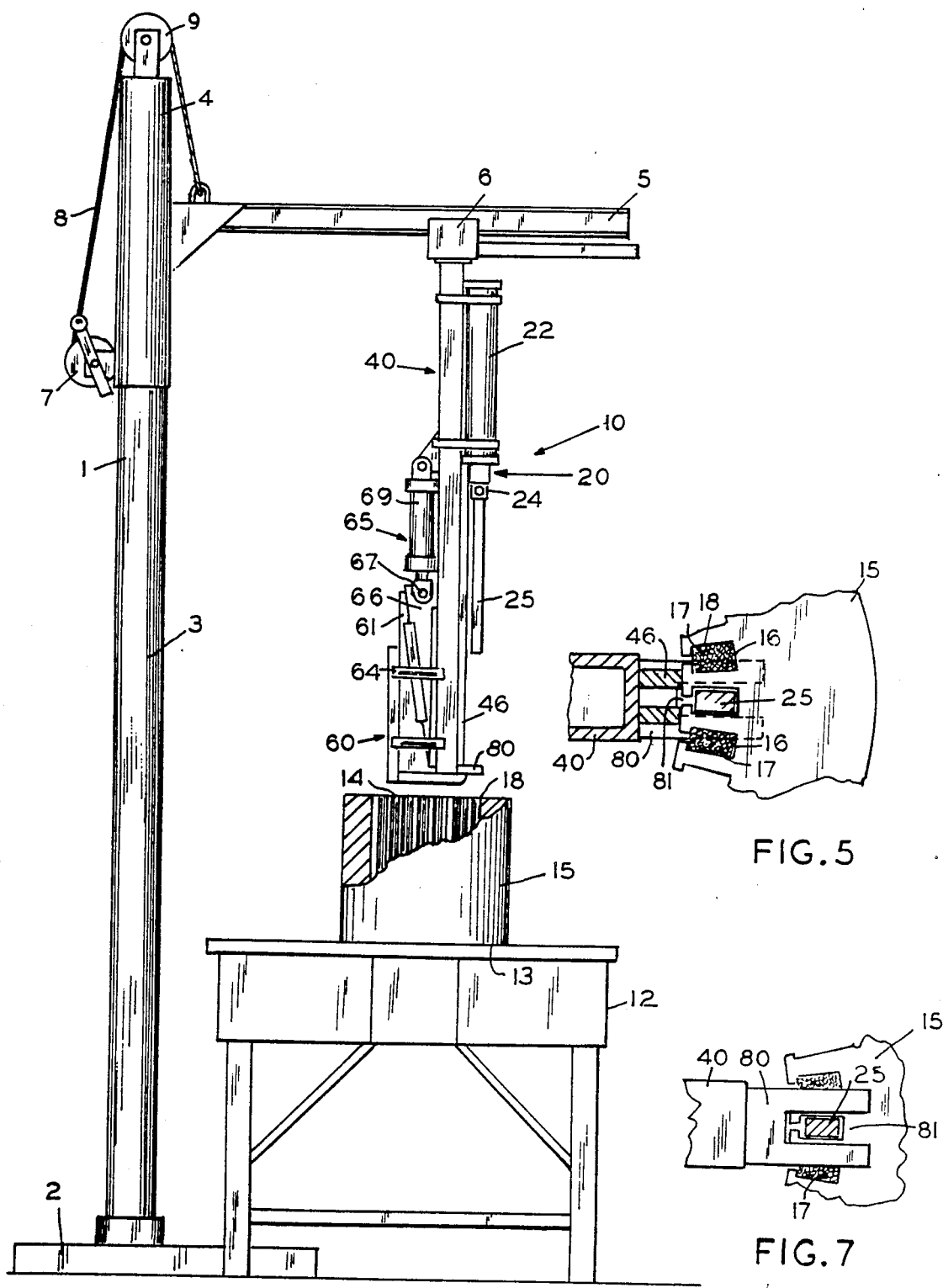
FIG. 1 is a side elevation of the apparatus, showing removal of wire from a stator.
FIG. 5 is an enlarged sectional view taken along lines 5—5 of FIG. 3.
FIG. 7 is a view taken along lines 7—7 of FIG. 3.

Referring now to the drawings, and, more particularly, to FIGS. 1, 2, and 3, an embodiment to be preferred of apparatus 10 for removing coil wire from a stator, made according to the present invention, is disclosed. Apparatus 10 includes, generally, wire removal means, designated by the numeral 20 and stator support means designated by the numeral 60. A hoist 1 may be used for holding and placement of the apparatus.

Hoist 1 includes a base 2 supporting a cylindrical column 3 provided with a sleeve 4 rotatable about the vertical axis of the column. To the sleeve is affixed a horizontal "I" beam 5 which serves as a track for trolley 6, to which is suspended a vertical support beam 40 carrying the wire removal means 20 and stator support means 60. A winch 7, having a cable 8, is attached to beam 5 over a sheave 9 mounted on the top of column 3. The winch, in combination with the rotatable sleeve and trolley, permits exact placement of the apparatus relative to the stator 15 from which coil wire is to be removed. The stator is normally placed upon a table 12 for wire removal.

Referring now to FIGS. 2 and 3, wire removal means 20 may be seen to advantage. Wire removal means 20, is mounted to vertical beam 40, which, in turn, is suspended from trolley 6 under slight bias of a spring, not shown. Wire removal means 20 comprises a driver, preferably a hydraulic piston-cylinder unit 22, reciprocally movable within the cylinder; and a push rod 25. Push rods 25 will differ, depending upon the size and shape of the stator slot, being substantially identical in cross-section, though obviously slightly smaller in diameter.

The push rod is connected to piston arm 23 by a chuck 24 which is adapted to hold push rods of varying sizes for ready replacement of the push rod. The chuck is provided with a guide pin 26 which is received within an elongated guide channel 46, affixed to or defined within vertical beam 40, for reciprocal linear movement therein, as shown in FIG. 4.

Stator support means 60, also shown to advantage in FIGS. 2, 3 and 6, in the preferred embodiment includes a first wedge 61; a second drive wedge 66 and drive means preferably comprising a piston-cylinder unit 65. First wedge 61 is provided with a pair of pins 62, each mounted for lateral movement within a slot 63 of vertically spaced brackets 64 affixed to vertical beam 40. Springs 70, connected between the pins and the vertical beam, bias the wedge into a contracted position, shown in FIG. 3. Drive wedge 66 is affixed to piston arm 76 by means of a pin 67 held by a clevis 68. It will be seen then, that as cylinder 69 fills with fluid, that piston arm 76 is forced downwardly causing second drive wedge 66 in a downward motion. As engaging surfaces of wedges 61 and 66 slide against one another, first wedge 61 is displaced laterally against the bias of springs 70. In use, vertical beam 40, with attached support means 60, is placed within the bore 14 of stator 15, as shown in FIG. 4. In this manner, the forwardmost portion of vertical beam 40 engages one surface defining the stator bore and the rearwardmost portion of the first wedge 61 engages the opposing surface defining the bore. It is obvious that spacers, not shown, may be used for accommodating the apparatus to stators having varying bore diameters. While wedge members are preferred for lateral displacement to engage the bore of the stator, an expansion balloon or other lateral displacement means may also be employed.

Referring to FIGS. 2 and 3, taken in conjunction with FIG. 5, slotted foot member 80, a part of the stator support means, may be seen. Foot member 80 is affixed to the lowermost end of vertical beam 40 and extends outwardly and laterally therefrom. The foot member defines a slot 81 for passage of wire 17 from aligned stator slots 16 therethrough. The foot member supports the bottom surface 13 of stator 15 adjacent opposite sides of slot 16 from which wire is to be removed, to prevent breakage of stator teeth defining the stator slot.

The method for utilizing said apparatus 10 is as follows. First, end turns from both ends of the stator are first removed, by either chisel or saw, leaving a stator having the general appearance as shown in FIG. 4, with wire bundles 17 cut adjacent the top surface 18 of the stator. The stator is then placed upon a table 12, as shown in FIG. 1, so that wire may freely be pushed so as to exit freely from the bottom of the stator. Apparatus 10 of the present invention is then positioned by means of hoist 1, with vertical beam 40 extending through bore 14 op the stator. Foot member 80 is then brought into position with the foot engaging the bottom surface of the stator and with slot 81 of the foot member in alignment with the stator slot from which wire is to be removed. In that the vertical beam is spring biased relative to trolley 6, correct placement is facilitated. Next, piston-cylinder unit 65 is actuated, causing extension of piston arm 76 forcing wedge 66 downward and hence wedge 61 laterally, against the tension of springs 70 so as to engage the interior surface of bore 14 of the stator. In such position the push rod 25 is in vertical alignment with a chosen slot of the stator, as shown in FIG. 4.

By actuation of piston-cylinder unit 22, piston arm 23 is lowered to bring the push rod 25 into contact with the wire bundle to be removed and proper alignment is assured. Upon further actuation of unit 22, push rod 25 is forced into the stator slot to push the wire bundle downwardly through slot 81 of foot member 80 and on out of the stator slot, as shown in FIG. 5.

While reference has been made to removal of wire from a stator, it is obvious that the same equipment can be employed to remove wire from the armature of an electric motor. For example, the device may be affixed to an armature as by a band extending about the armature with the expansion means placed between the band and the armature to hold the wire removal means in alignment with an armature slot. It is contemplated that the device may have other wire removing applications as well.

Having thus described in detail preferred embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Apparatus for removing from a stator, coil wire contained within elongated slots in the stator and from which opposing end turns have been severed, said apparatus comprising:

a vertical support beam;

wire removal means affixed to said vertical support beam, said wire removal means including at least one push rod for engaging a severed end of wire within a stator slot and drive means for moving said push rod within the stator slot to push severed wire therefrom; and stator support means affixed to said vertical beam for holding said wire removal means in a fixed vertical alignment relative to the longitudinal axis of the stator slots.

2. The apparatus of claim 1, wherein said push rod is substantially identical in cross-section to the stator slot in which it moves.

3. The apparatus of in claim 1 wherein said stator support means includes stator bore engagement means for engaging laterally opposed surfaces defining the bore.

4. The apparatus of in claim 3 wherein said stator bore engagement means includes a first wedge mounted for lateral movement relative to said vertical support beam; a second drive wedge engageable with said first wedge; and drive means for vertical reciprocation of said drive wedge to cause lateral displacement of said first wedge to selectively engage the surfaces of the stator defining the bore.

5. The apparatus of in claim 1 wherein said stator support means further comprises a foot member for supporting the bottom surface of the stator adjacent the slot from which wire is to be removed.

6. The apparatus of in claim 5 wherein said foot member defines a slot for registry with the stator slot for the passage of displaced coil wire therethrough.

7. The apparatus of in claim 1 wherein said drive means comprises a piston-cylinder unit.

8. The apparatus of in claim 1 further comprising a hoist for overhead support of said apparatus, said hoist including a horizontally extending beam rotatable about a vertical axis; a winch for raising or lowering said horizontal beam; and a trolley movable along the length of said beam for positioning of said apparatus relative to the stator.

9. Apparatus for removing from an electric motor stator, coil wire contained within stator slots and having opposing coil end turns severed therefrom, said apparatus comprising:

a vertical beam;

wire removal means affixed to said beam, said wire removal means including a piston-cylinder and a push rod connected to said piston, said push rod operable to engage a severed end of wire within a stator slot to push wire from said slot upon actuation of said piston-cylinder unit; and stator support means mounted on said vertical beam, said stator support means including a slotted foot member affixed to the lowermost end of said vertical beam for engaging a portion of the bottom surface of the stator adjacent the stator slot from which wire is to be removed, said slot of said foot member in vertical alignment with said slot of said stator for passage of displaced coil wire therethrough and said stator support means further including stator bore engagement means for holding said push rod in vertical alignment with said stator slot.

10. The apparatus of in claim 9 wherein said stator bore engagement means includes a first wedge mounted on said vertical beam for lateral movement relative thereto; a second drive wedge engageable with said first wedge; and a piston-cylinder unit mounted on said vertical beam, said piston of said unit connected to said second wedge for vertical reciprocation thereof to cause lateral displacement of said first wedge to selectively engage the surface of the stator defining the bore.

* * * * *